May 4, 1926.

C. L. BRYANT 1,583,122

VALVE CONTROL MECHANISM

Filed August 13, 1925     3 Sheets-Sheet 1

Charles L. Bryant
Inventor
by Smith and Freeman
Attorneys

May 4, 1926.
C. L. BRYANT
1,583,122
VALVE CONTROL MECHANISM
Filed August 13, 1925    3 Sheets-Sheet 2
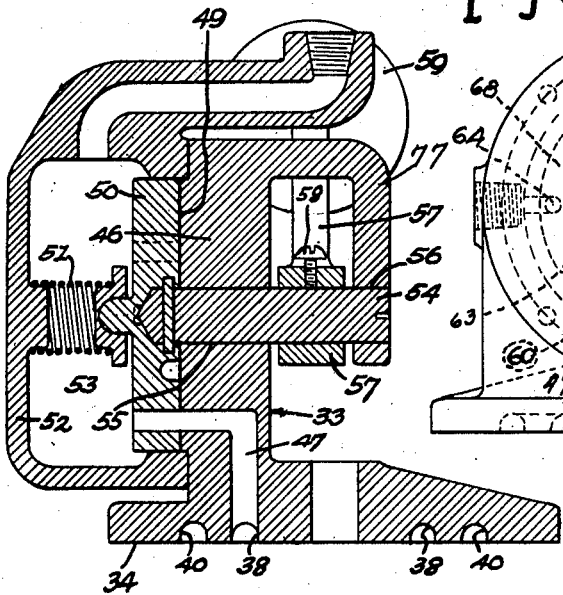
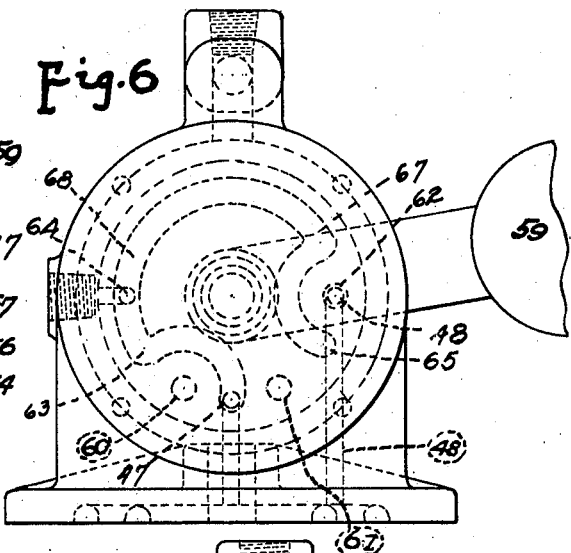
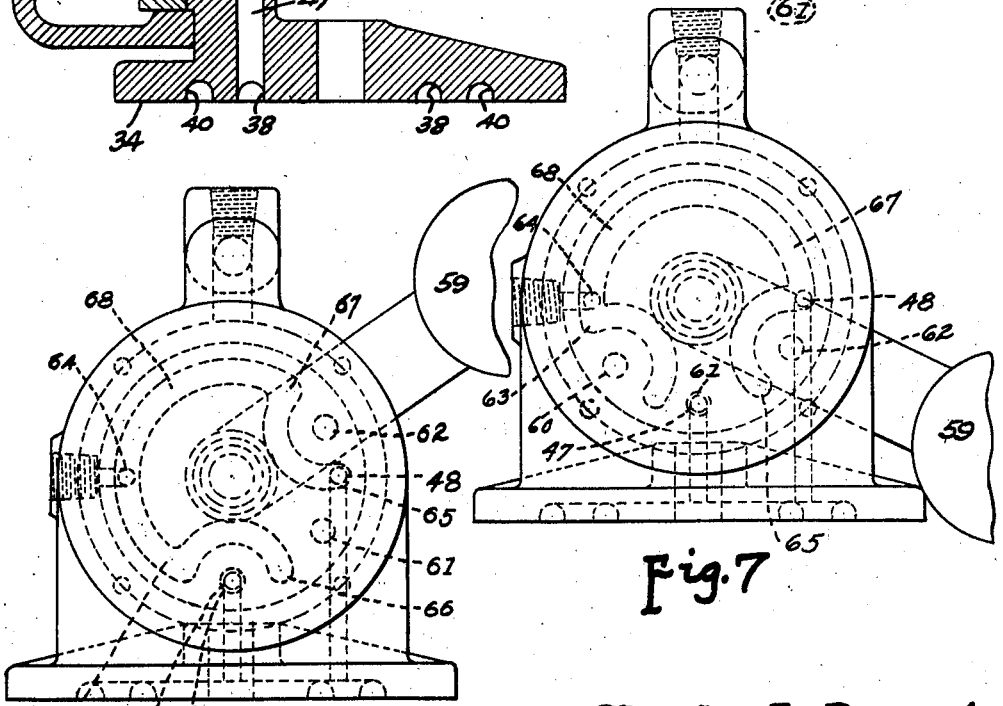
Charles L. Bryant.
Inventor
Attorneys

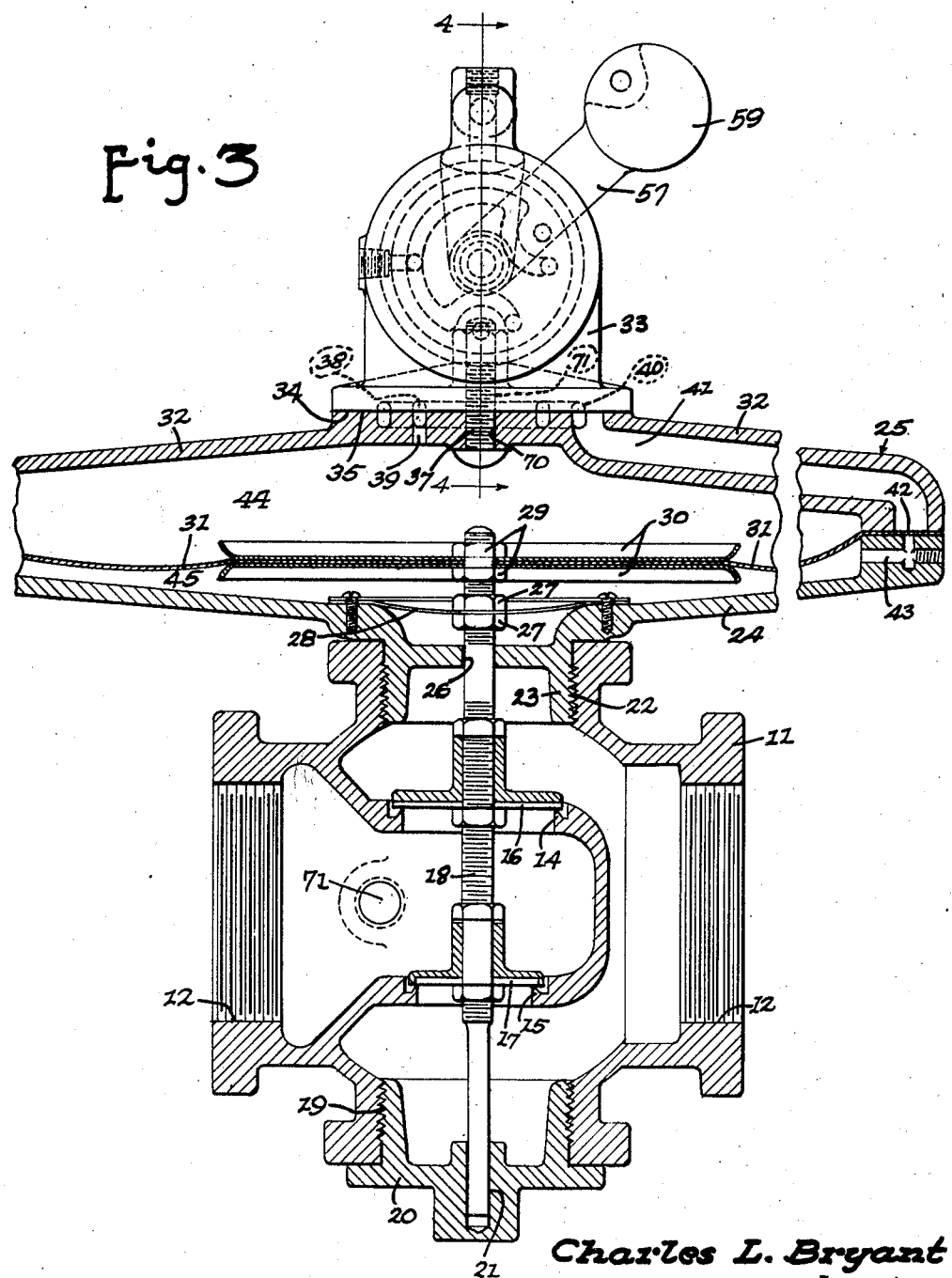

Patented May 4, 1926.

1,583,122

UNITED STATES PATENT OFFICE

CHARLES L. BRYANT, OF CLEVELAND, OHIO.

VALVE-CONTROL MECHANISM.

Application filed August 13, 1925. Serial No. 49,937.

*To all whom it may concern:*

Be it known that I, CHARLES L. BRYANT, a citizen of the United States of America, and a resident of Cleveland, in the county of Cuyahoga and State of Ohio, have invented certain new and useful Improvements in Valve-Control Mechanism, of which the following is a full, clear, and exact description.

My invention relates to valve control mechanism and the principal object of my invention is to provide new and improved mechanism of this type. In the drawings accompanying this specification and form-ing a part thereof I have shown for purposes of illustration, one form which my invention may assume. In these drawings.

Figure 1:
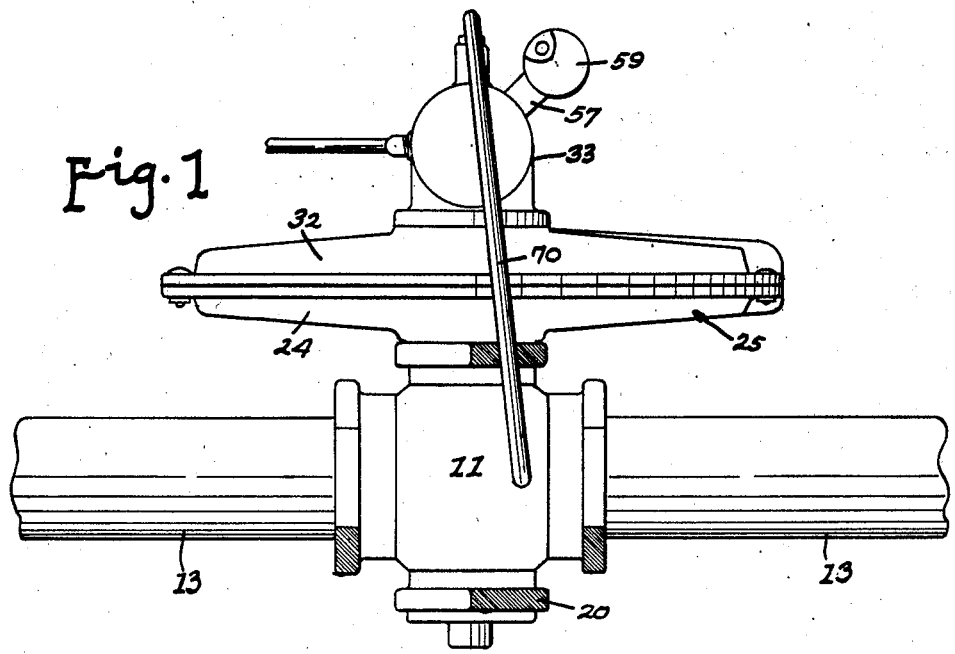
Figure 1 is a side elevation of this illustrative embodiment of my invention.
Figure 2:
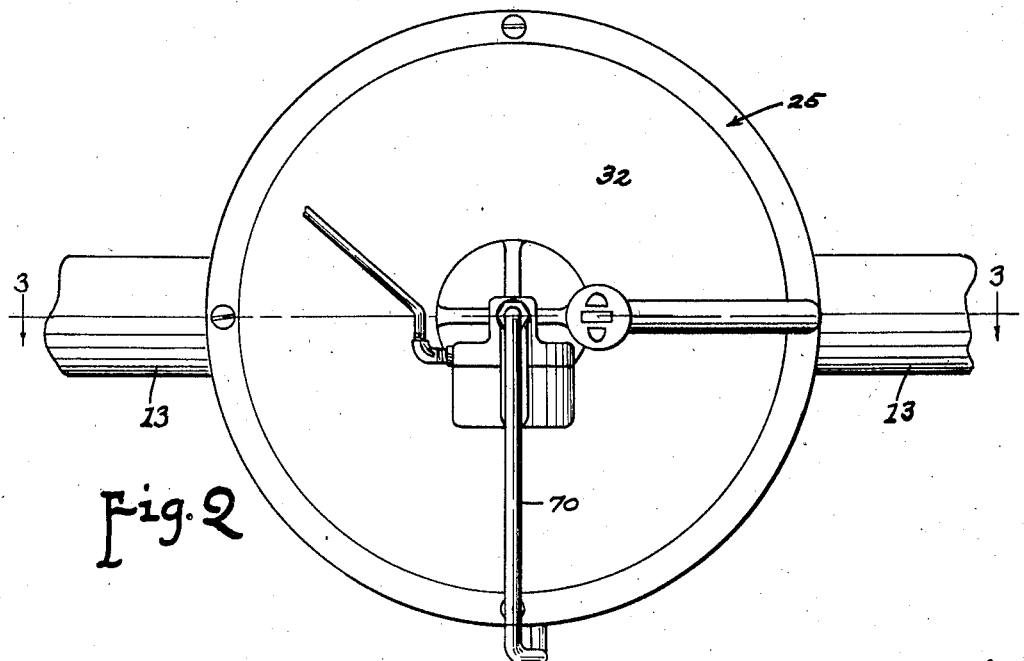
Figure 2 is a plan view of the device shown in Figure 1.

Figure 3 is an enlarged section through the valve and valve actuating mechanism taken on the line 3—3 of Figure 2, Figure 4 is an enlarged section through the control valve taken on the line 4—4 of Figure 3, while Figures 5, 6, and 7 are diagrammatic views showing the control valve in its three positions.

The device herein show comprises a supply valve 11 provided with apertures 12 adapted to receive the connecting conduits 13, with a pair of valve seats 14 and 15 arranged to receive the valve disks 16 and 17, with a stem 18 arranged to carry the valve disks 16 and 17, with an aperture 19 arranged to receive a plug 20 provided with a recess 21 adapted to support the lower end of the valve stem 18, and with an aperture 22 arranged to receive a projection 23 extending from the lower face 24 of a diaphragm motor 25 and provided with an aperture 26 adapted to support therein the upper end of the valve stem 18 and permit this upper end of the valve stem 18 to project into the cavity of the diaphragm motor 25. Secured to the upper end of the valve stem 18, by means of nuts 27, is a sealing diaphragm 28 tightly secured at its periphery to the lower face 24 of the diaphragm motor 25 and effective to prevent leakage from the valve 11 into the cavity of the diaphragm motor 25. Also secured to the upper end of the valve stem 18, by means of nuts 29 engaging re-enforce-ments 30, is the actuating diaphragm 31 secured at its periphery between the lower and upper plates 24 and 32 of the diaphragm motor 25.

From the above description it will be obvious that the entrance of fluid into the chamber 44 between the top plate 32 and the diaphragm 31 will compress downwardly the diaphragm 31 and valve stem 18 to seat the valve disks 16 and 17 on the valve seats 14 and 15 and thus close the valve 11, and that the entrance of fluid into the chamber 45 between the lower plate 24 and the diaphragm 31 will raise the diaphragm 31 and valve stem 18 to move the disks 16 and 17 from the valve seats 14 and 15 and thus open the valve 11.

Mounted upon the diaphragm motor 25 is a control valve 33 provided with a flat lower face 34 arranged to engage the flat face 35 on the upper plate 32 of the diaphragm motor 25, while passing through an aperture 70 in the upper plate 32 of the diaphragm motor 25 and an aperture 71 in the base 36 of the control valve 33 is a single bolt 37 effective to permit relative rotative movement between the control valve 33 and the diaphragm motor 25 and to then fix the control valve 33 and diaphragm motor 25 with the faces 34 and 35 in engagement in any desired relative rotative position.

Formed on the lower face 34 of the control valve 33 is an annular recess 38 positioned to engage, in any relative rotative relation of the control valve 33 and diaphragm motor 25, with a recess in the face 35 on the top plate 32 which continues as a duct 39 leading through the top plate 32 into the chamber 44 between the top plate 32 and the diaphragm 31, and a second annular recess 40 positioned to be in engagement, in any relative rotative relation of the control valve 33 and diaphragm motor 25, with a recess in the surface 35 of the top plate 32 which continues as a duct 41 formed in the top plate 32 and communicating through an aperture 42 in the diaphragm 31 with a co-operating duct 43 formed in the lower plate 24 of the diaphragm motor 25 and leading to the chamber 45 between this lower plate 24 and the diaphragm 31. Formed in the upright section 46 of the control valve 33 are a pair of ducts 47 and 48 leading from these annular recesses 38 and 40 to a vertical surface 49 on this upright section 46 formed to be engaged by a valve disk 50 which is resiliently held against the surface 49 by means of a spring 51 compressed between the valve disk 50 and the wall 52 of an inlet chamber 53, is supported upon a shaft 54 rotatably mounted in bearings 55 and 56 carried respectively by the upright section 46 and an arm 77 depending therefrom, and is actuated by means of a lever 57 secured to the shaft 54 by means of a set screw 58 and provided on its outer end with a counter-weight 59 effective to bias the lever into its lowest position and the valve disk 50 into the position corresponding thereto.

Formed in this valve disk 50 are a pair of apertures 60 and 61 each positioned to function in one extreme position of the valve disk 50 to connect the inlet chamber 53 with the duct 47 leading to the annular recess 38 and thence to the upper diaphragm motor chamber 44, and a third aperture 62 positioned to function in the intermediate position of the valve to connect the inlet chamber 53 with the annular recess 40 and thus with the lower diahpragm motor chamber 25. Also formed in the engaging face of the disk 50 is an irregular recess 63 provided with a tip 65 arranged to engage the duct 48 in the first extreme position of the disk 50, a tip 66 arranged to engage the duct 47 in the intermediate position of the disk 50, a body section 67 arranged to engage the duct 48 in the second extreme position of the disk 50, and an elongated body section 68 arranged to engage in all positions of the disk 50 with an outlet duct 64.

In the embodiment shown herein fluid is supplied to the inlet chamber 53 through a duct 70 entering the inlet side of the valve 11 through an aperture 71.

From the above description it will be obvious that in either extreme position of the valve disk 50 the inlet chamber 53 is connected to the upper diaphragm chamber 44 to provide fluid pressure on the top of the diaphragm 31 to close the valve 11, and the lower diaphragm chamber 45 is connected to the outlet duct 64 to permit escape of any fluid contained therein, and that in the intermediate position of the disk 50 the inlet chamber 53 is connected to the lower diaphragm 45 to provide fluid pressure on the under side of the diaphragm 31 to open the valve 11, and the upper diaphragm chamber 44 is connected to the outlet duct 64 to permit escape of any fluid contained therein. It will therefore be obvious that the valve 11 is closed in either extreme position of the control valve 33 and open only in the intermediate position of this control valve 33.

Those skilled in the art are aware that a control valve of this type is usually operated by a cable extending from some sort of automatic actuating device, and that it is an almost universal requirement that the control valve be so arranged that severance of this cable will cause closure of the fuel valve. Those skilled in the art are also aware that for this reason it has heretofore been necessary to cause the automatic device to impart fuel valve opening actuation by slackening of the cable even though in many instances it would be far more convenient to achieve this result by a reverse action. Those skilled in the art will therefore realize that my control valve may not only be positioned on the diaphragm motor at any desired angle to facilitate connection with the cable but also provides an arrangement whereby the control valve complies with the requirement that it shall effect closing of the fuel valve upon severance of the cable and at the same time permits a connection whereby fuel valve opening actuation of the control valve is by an upward movement of the cable.

In addition, those skilled in the art will readily find advantages in the device herein shown other than those specifically pointed out herein and will also readily realize that the particular embodiment of my invention herein shown may be variously changed and modified without departing from the spirit of my invention or sacrificing the advantages thereof. It will therefore be understood that this disclosure is illustrative only and that my invention is not limited thereto.

I claim:

1. Fuel feed control means comprising a fuel supply valve having an oscillating operating member, an oscillating pressure responsive valve operating device having its actuated member connected to said operating member, a control valve for said pressure responsive device having two functioning positions in which said valve operating device operates to close said fuel supply valve and an intermediate position in which said valve operating device operates to open said fuel supply valve, and biasing means constantly tending to move said control valve to one extreme position.

2. Fuel feed control means comprising a fuel supply valve having an oscillating operating member, an oscillating pressure responsive valve operating device having its actuated member connected to said operating member, a control valve for said pressure responsive device having two functioning positions in which said valve operating device operates to close said fuel supply valve and an intermediate position in which said valve operating device operates to open said fuel supply valve, biasing means constantly tending to move said control valve to one extreme position, and means normally effective to hold said control valve in intermediate position and move said control valve to the other extreme position, all against the action of said biasing means.

3. Fuel feed control means comprising a fuel supply valve having an oscillating operating member, an oscillating pressure responsive valve operating device having its actuated member connected to said operating member, a control valve for said pressure responsive device having its movable member rotating on a horizontal axis and having two functioning positions in which said valve operating device operates to close said fuel supply valve and an intermediate position in which said valve operating device operates to open said fuel supply valve, and a weight mounted on the axis of said movable member and constantly tending to move said control valve to one extreme position.

4. Fuel feed control means comprising a fuel supply valve having an oscillating operating member, an oscillating pressure responsive valve operating device having its actuated member connected to said operating member, a control valve for said pressure responsive device having its movable member rotating on a horizonal axis and having two functioning positions in which said valve operating device operates to close said fuel supply valve and an intermediate position in which said valve operating device operates to open said fuel supply valve, a weight mounted on the axis of said movable member and constantly tending to move said control valve to one extreme position, and means normally effective to hold said control valve in intermediate position and move said control valve to the other extreme position, all against the action of said biasing means.

5. Fuel feed control means comprising a fuel supply valve having an oscillating operating member, an oscillating pressure responsive valve operating device having its actuated member connected to said operating member, a control valve for said pressure responsive device having two functioning positions in which said control valve supplies fluid to said valve operating device to cause said valve operating device to close said fuel supply valve and an intermediate position in which said control valve supplies fluid to said valve operating device to cause said valve operating device to operate to open said fuel supply valve, and biasing means constantly tending to move said control valve to one extreme position.

6. Fuel feed control means comprising a fuel supply valve having an oscillating operating member, an oscillating pressure responsive valve operating device having its actuated member connected to said operating member, a control valve for said pressure responsive device having two functioning positions in which said control valve supplies fluid to said valve operating device to cause said valve operating device to operate to close said fuel supply valve and an intermediate position in which said control valve supplies fluid to said valve operating device to cause said valve operating device to operate to open said fuel supply valve, biasing means constantly tending to move said control valve to one extreme position, and means normally effective to hold said control valve in intermediate position and move said control valve to the other extreme position all against the action of said biasing means.

7. A fluid pressure actuated operating mechanism comprising a fluid pressure actuated operating means, a control valve therefor, and means for securing said control valve directly to said operating means in any one of a plurality of positions, said control valve and said operating means engaging over faces of considerable extent provided with at least one pair of cooperating recesses arranged to be in communication in a plurality of positionings of said valve on said operating means, said valve being provided with an operating fluid duct leading to each such recess on said engaging face of said valve, and said operating means being provided with an operating fluid duct leading to each such recess on said engaging face of said operating means.

8. A fluid pressure actuated operating mechanism comprising a fluid pressure actuated operating means, a control valve therefor, and means for securing said control valve directly to said operating means permitting relative rotation of said valve and said operating means and fixation in any relative position so assumed, said control valve and said operating means engaging over faces of considerable extent, one of said faces being provided with at least one annular recess arranged to be in communication with a cooperating recess on the other of said faces in a plurality of positionings of said valve on said operating means, said valve being provided with an operating fluid duct leading to each such recess on said engaging face of said valve, and said operating means being provided with an operating fluid duct leading to each such recess on said engaging face of said operating means.

9. A fluid pressure actuated operating mechanism comprising a fluid pressure actuated operating means, a control valve therefor, and means for securing said control valve directly to said operating means in any one of a plurality of positions, said control valve and said operating means engaging over faces of considerable extent provided with at least two pair of recesses with the recesses of each pair independent of the recesses of each other pair but arranged to be in communication with each other in a plurality of positionings of said valve on said operating means, said valve being provided with an operating fluid duct leading to each such recess on said engaging face of said valve, and said operating means being provided with an operating fluid duct leading to each such recess on said engaging face of said operating means.

10. A fluid pressure actuated operating mechanism comprising a fluid pressure actuated operating means, a control valve therefor, and means for securing said control valve directly to said operating means in any one of a plurality of positions, said control valve and said operating means engaging over faces of considerable extent provided with at least one pair of cooperating recesses arranged to be in communication in all positionings of said valve on said operating means, said valve being provided with an operating fluid duct leading to each such recess on said engaging face of said valve, and said operating means being provided with an operating fluid duct leading to each such recess on said engaging face of said operating means.

11. A fluid pressure actuated operating mechanism comprising a fluid pressure actuated operating means, a control valve therefor, and means for securing said control valve directly to said operating means permitting relative rotation of said valve and said operating means and fixation in any relative position so assumed, said control valve and said operating means engaging over faces of considerable extent, one of said faces being provided with at least one annular recess arranged to be in communication with a cooperating recess on the other of said faces in all positionings of said valve on said operating means, said valve being provided with an operating fluid duct leading to each such recess on said engaging face of said valve, and said operating means being provided with an operating fluid duct leading to each such recess on said engaging face of said operating means.

In testimony whereof I hereunto affix my signature.

CHARLES L. BRYANT.